United States Patent
Xue et al.

(10) Patent No.: US 7,796,557 B2
(45) Date of Patent: Sep. 14, 2010

(54) METHODS AND APPARATUS FOR THE COMMUNICATION OF NETWORK CAPABILITY INFORMATION OVER A TRAFFIC CHANNEL

(75) Inventors: Hao Xue, Ottawa (CA); William Daniel Willey, San Francisco, CA (US); Muhammad Khaledul Islam, Ottawa (CA)

(73) Assignee: Research In Motion Limited, Waterloo, Ontario (CA)

( * ) Notice: Subject to any disclaimer, the term of this patent is extended or adjusted under 35 U.S.C. 154(b) by 950 days.

(21) Appl. No.: 11/029,945

(22) Filed: Jan. 5, 2005

(65) Prior Publication Data

US 2005/0201382 A1 Sep. 15, 2005

Related U.S. Application Data

(60) Provisional application No. 60/534,578, filed on Jan. 5, 2004.

(51) Int. Cl.
*H04W 4/00* (2009.01)
(52) U.S. Cl. ........... 370/332; 455/414.1; 455/414.2; 455/414.3; 455/414.4; 455/450; 455/451; 455/452.1; 455/452.2; 455/456.1; 455/456.2; 455/456.3; 455/456.4; 455/456.5; 455/456.6; 455/457
(58) Field of Classification Search ......... 370/335, 370/395.21; 455/434, 436, 458, 560, 414.1–414.4, 455/450–452.2, 456.1, 457
See application file for complete search history.

(56) References Cited

U.S. PATENT DOCUMENTS

| | | | |
|---|---|---|---|
| 6,216,004 B1 * | 4/2001 | Tiedemann et al. | 455/442 |
| 6,625,198 B1 * | 9/2003 | Tiedemann et al. | 375/130 |
| 6,963,550 B2 * | 11/2005 | Choi et al. | 370/331 |
| 7,095,732 B1 * | 8/2006 | Watson, Jr. | 370/346 |
| 7,130,285 B2 * | 10/2006 | Chang | 370/331 |
| 7,133,683 B1 * | 11/2006 | Budney et al. | 455/456.1 |
| 7,170,872 B2 * | 1/2007 | Uskela | 370/332 |
| 7,430,422 B2 * | 9/2008 | Nagatsuma et al. | 455/456.3 |
| 2001/0030953 A1 * | 10/2001 | Chang | 370/331 |
| 2002/0055364 A1 * | 5/2002 | Wang et al. | 455/466 |
| 2003/0032430 A1 | 2/2003 | Lee | |
| 2004/0142702 A1 * | 7/2004 | Hefner et al. | 455/456.1 |

(Continued)

FOREIGN PATENT DOCUMENTS

WO 2005020611 A1 3/2005

OTHER PUBLICATIONS

European Search Report—EPO Application # 05759640.5—Date: Oct. 24, 2008.

*Primary Examiner*—Nick Corsaro
*Assistant Examiner*—Liton Miah
(74) *Attorney, Agent, or Firm*—John J. Oskorep, Esq.

(57) ABSTRACT

In one illustrative example, when a mobile station operative for communications in a wireless communication network is engaged in a call, an in-traffic channel message is transmitted from a base station to the mobile station. The message includes information indicative of whether the wireless network supports a predetermined concurrent service or feature. The predetermined concurrent service or feature may be a mobile-requested Quality of Service (QoS) parameter usage feature or a mobile-initiated position location determination feature. The in-traffic channel message may be an in-traffic system parameter message, a general handoff direction message, or a universal handoff direction message, as examples. Preferably, the wireless network is a cdma2000-type network. Since the mobile station is made aware of such information, more efficient operation may be realized.

35 Claims, 4 Drawing Sheets

U.S. PATENT DOCUMENTS

2004/0180655 A1* 9/2004 Jang et al. .................. 455/433
2004/0203780 A1* 10/2004 Julka et al. .................. 455/436
2004/0252670 A1* 12/2004 Rong et al. .................. 370/343
2005/0078637 A1* 4/2005 Rajkotia ..................... 370/335

* cited by examiner

METHODS AND APPARATUS FOR THE COMMUNICATION OF NETWORK CAPABILITY INFORMATION OVER A TRAFFIC CHANNEL

CROSS-REFERENCE TO RELATED APPLICATION

The present application claims priority to U.S. Provisional Patent Application entitled "Methods And Apparatus For The Communication Of Network Capability Information Over A Traffic Channel" having Ser. No. 60/534,578 and a filing date of 5 Jan. 2004, which is hereby incorporated by reference herein.

BACKGROUND

1. Field of the Technology

The present application relates generally to a wireless communication system which include base stations and mobile stations, and more particularly to a wireless communication system which provides for the communication of network capability information over a traffic channel for concurrent services.

2. Description of the Related Art

A mobile communication device, such as a mobile station operating in a wireless communication network, may provide for both voice calls and data communications for an end user. The mobile station and network may, for example, be compatible with cdma2000® standards. Cdma2000® is a registered trademark of the Telecommunications Industry Association (TIA-USA).

In accordance with cdma2000® standard Release D, an indication of whether or not a mobile station and network supports "concurrent services" may be utilized. Concurrent services are supported by the mobile station and network when at least two different services—specifically a voice call service and a data communication service—may be facilitated simultaneously. Such a mobile station provides for the ability to simultaneously engage in voice telephone calls and data communication sessions (e.g. electronic mail or e-mail communications), where the voice telephone call utilizes a first traffic channel (e.g. a Primary traffic channel) and the data communication session utilizes a second traffic channel (e.g. a Secondary traffic channel).

In accordance with the aforementioned standard, an in-traffic channel message which includes a CS_SUPPORTED flag is used to indicate whether or not concurrent services are supported. A mobile station indicates its concurrent service capability in a "Capability Information" message to the network. On the other hand, a network broadcasts its concurrent service capability to a mobile station in an overhead message during idle states (specifically, in an "Extended System Parameter" message) or in an in-traffic channel message (specifically, in an "In-Traffic System Parameter" message, a "General Handoff Direction" message, or a "Universal Handoff Direction" message) during voice/data communication states. If a network supports concurrent services, however, it may or may not support other specific concurrent service-related features. For example, although the network may generally support concurrent services, it may or may not allow the mobile station to request Quality of Service (QoS) parameters when it originates a data call for a specific application. Similarly, the network may or may not support a mobile-initiated position location determination feature.

The present application specifically relates to the case where a mobile station is engaged in a call (e.g. a voice or data call) where a traffic channel is utilized and the mobile station is moving onto a new network. If the mobile station receives an indication that the new network generally supports concurrent services ("CS_SUPPORTED=1"), inefficiencies may result if the mobile station assumes that another specific concurrent service-related feature (e.g. mobile-originated QoS parameter or position location determination request) is or is not supported. For example, the mobile station may initiate a request for a feature that is not supported by the network. As another example, the mobile station may refrain from initiating a request for a feature that is in fact supported by the network.

Accordingly, there is a need for methods and apparatus which overcome the deficiencies of the prior art.

SUMMARY

Methods and apparatus for the communication of network capability information are described. When the mobile station is engaged in a call, an in-traffic channel message is transmitted from a base station of a wireless communication network to the mobile station. The message includes information indicative of whether the network supports a predetermined concurrent service or feature. The predetermined concurrent service or feature may be a mobile-requested Quality of Service (QoS) parameter usage feature or a mobile-initiated position location determination feature, as examples. The in-traffic channel message may be an in-traffic system parameter message, a general handoff direction message, or a universal handoff direction message, as examples. Preferably, the network is a cdma2000-type network.

Since the mobile station is made aware of such additional information, more efficient operation may be realized. For example, if the predetermined concurrent service or feature is the mobile-requested QoS parameter usage feature, the mobile station causes a message to be sent to the wireless network with QoS parameters if the information is indicative that the wireless network supports the QoS parameter usage feature, or refrains from causing the message to be sent to the wireless network with the QoS parameters if the information is indicative that the wireless network fails to support the QoS parameter usage feature. If the predetermined concurrent service or feature is the mobile-initiated position location determination feature, the mobile station causes a position location request message to be sent to the wireless network if the information is indicative that the wireless network supports the mobile-initiated position location determination feature, or refrains from causing the position location request message to be sent to the wireless network if the information is indicative that the wireless network fails to support the mobile-initiated position location determination feature.

BRIEF DESCRIPTION OF THE DRAWINGS

Embodiments of present invention will now be described by way of example with reference to attached figures, wherein.

DETAILED DESCRIPTION OF THE PREFERRED EMBODIMENTS

Figure 1:
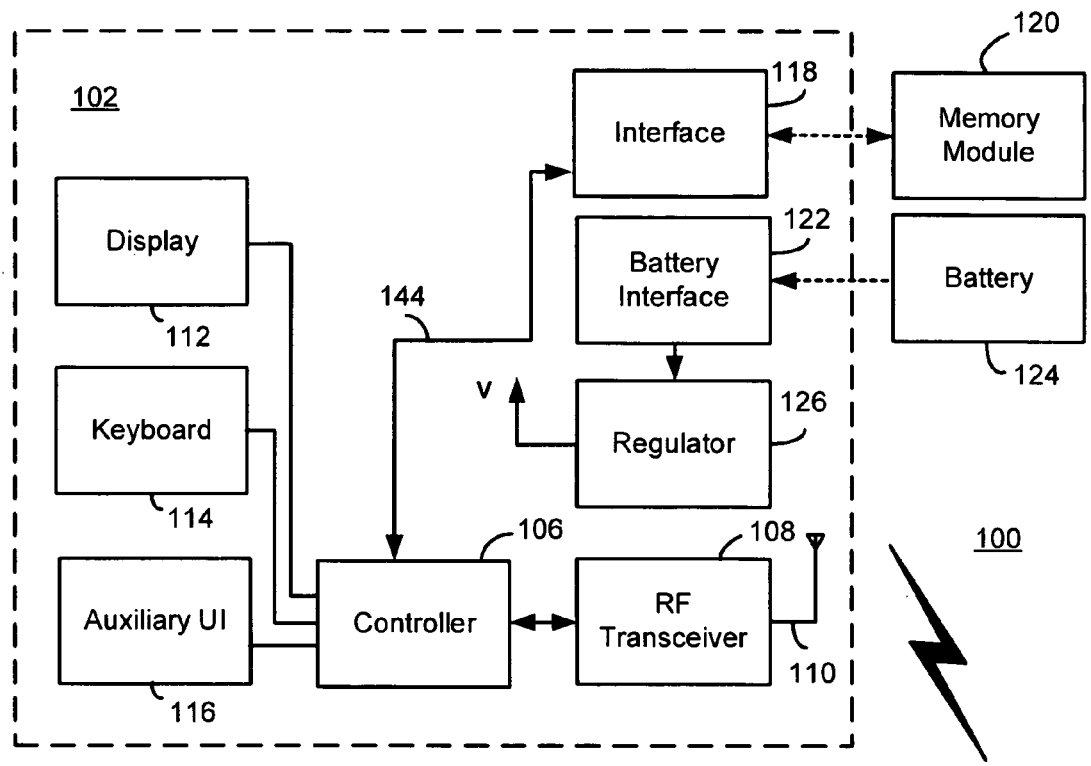
FIG. 1 is a block diagram which illustrates pertinent components of a mobile communication device (e.g. a mobile station) which communicates within a wireless communication network having a plurality of base stations.
Figure 1:
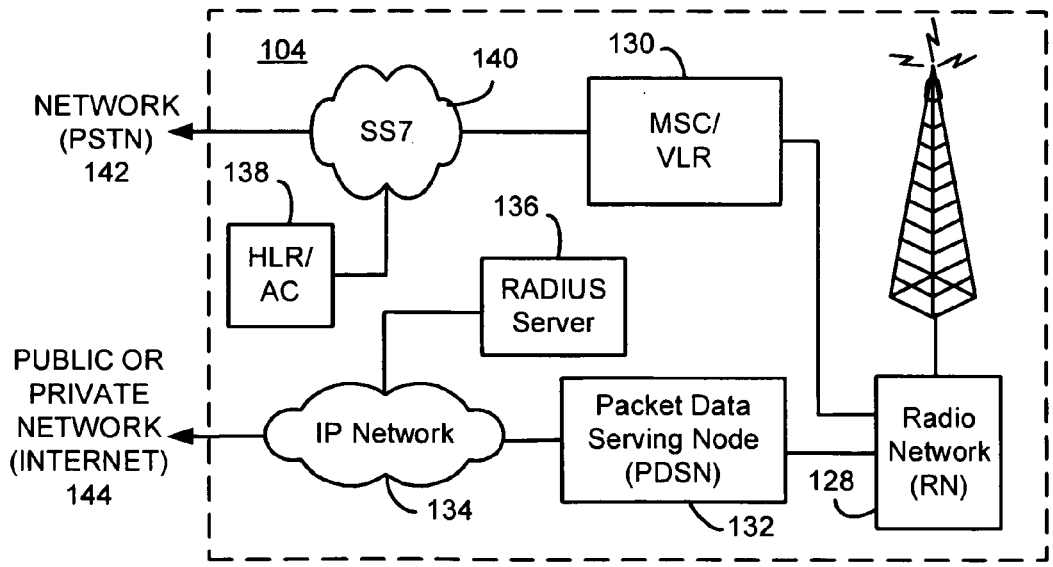

FIG. 1 is a block diagram of a communication system 100 which includes a mobile station 102 which communicates through a wireless communication network 104. Mobile station 102 preferably includes a visual display 112, a keyboard 114, and perhaps one or more auxiliary user interfaces (UI) 116, each of which is coupled to a controller 106. Controller 106 is also coupled to radio frequency (RF) transceiver circuitry 108 and an antenna 110.

Typically, controller 106 is embodied as a central processing unit (CPU) which runs operating system software in a memory component (not shown). Controller 106 will normally control overall operation of mobile station 102, whereas signal processing operations associated with communication functions are typically performed in RF transceiver circuitry 108. Controller 106 interfaces with device display 112 to display received information, stored information, user inputs, and the like. Keyboard 114, which may be a telephone type keypad or full alphanumeric keyboard, is normally provided for entering data for storage in mobile station 102, information for transmission to network 104, a telephone number to place a telephone call, commands to be executed on mobile station 102, and possibly other or different user inputs.

Mobile station 102 sends communication signals to and receives communication signals from network 104 over a wireless link via antenna 110. RF transceiver circuitry 108 performs functions similar to those of a radio network (RN) 128, including for example modulation/demodulation and possibly encoding/decoding and encryption/decryption. It is also contemplated that RF transceiver circuitry 108 may perform certain functions in addition to those performed by RN 128. It will be apparent to those skilled in art that RF transceiver circuitry 108 will be adapted to particular wireless network or networks in which mobile station 102 is intended to operate.

Mobile station 102 includes a battery interface 122 for receiving one or more rechargeable batteries 124. Battery 124 provides electrical power to electrical circuitry in mobile station 102, and battery interface 122 provides for a mechanical and electrical connection for battery 124. Battery interface 122 is coupled to a regulator 126 which regulates power to the device. Mobile station 102 also operates using a memory module 120, such as a Subscriber Identity Module (SIM) or a Removable User Identity Module (R-UIM), which is connected to or inserted in mobile station 102 at an interface 118.

Mobile station 102 may consist of a single unit, such as a data communication device, a cellular telephone, a multiple-function communication device with data and voice communication capabilities, a personal digital assistant (PDA) enabled for wireless communication, or a computer incorporating an internal modem. Alternatively, mobile station 102 may be a multiple-module unit comprising a plurality of separate components, including but in no way limited to a computer or other device connected to a wireless modem. In particular, for example, in the mobile station block diagram of FIG. 1, RF transceiver circuitry 108 and antenna 110 may be implemented as a radio modem unit that may be inserted into a port on a laptop computer. In this case, the laptop computer would include display 112, keyboard 114, one or more auxiliary UIs 116, and controller 106 embodied as the computer's CPU. It is also contemplated that a computer or other equipment not normally capable of wireless communication may be adapted to connect to and effectively assume control of RF transceiver circuitry 108 and antenna 110 of a single-unit device such as one of those described above. Such a mobile station 102 may have a more particular implementation as described later in relation to mobile station 202 of FIG. 2.

Mobile station 102 communicates in and through wireless communication network 104. In the embodiment of FIG. 1, wireless network 104 is a Third Generation (3G) supported network based on Code Division Multiple Access (CDMA) technologies. In particular, wireless network 104 is a cdma2000® network which includes fixed network components coupled as shown in FIG. 1. The mobile station and network may, for example, be compatible with cdma2000® (standards. Cdma2000® is a registered trademark of the Telecommunications Industry Association (TIA-USA). Wireless network 104 of the cdma2000-type includes a Radio Network (RN) 128, a Mobile Switching Center (MSC) 130, a Signaling System 7 (SS7) network 140, a Home Location Register/Authentication Center (HLR/AC) 138, a Packet Data Serving Node (PDSN) 132, an IP network 134, and a Remote Authentication Dial-In User Service (RADIUS) server 136. SS7 network 140 is communicatively coupled to a network 142 (such as a Public Switched Telephone Network or PSTN), whereas IP network is communicatively coupled to a network 144 (such as the Internet).

During operation, mobile station 102 communicates with RN 128 which performs functions such as call-setup, call processing, and mobility management. RN 128 includes a plurality of base station transceiver systems that provide wireless network coverage for a particular coverage area commonly referred to as a "cell". A given base station transceiver system of RN 128, such as the one shown in FIG. 1, transmits communication signals to and receives communication signals from mobile stations within its cell. The base station transceiver system normally performs such functions as modulation and possibly encoding and/or encryption of signals to be transmitted to the mobile station in accordance with particular, usually predetermined, communication protocols and parameters, under control of its controller. The base station transceiver system similarly demodulates and possibly decodes and decrypts, if necessary, any communication signals received from mobile station 102 within its cell. Communication protocols and parameters may vary between different networks. For example, one network may employ a different modulation scheme and operate at different frequencies than other networks. The underlying services may also differ based on its particular protocol revision.

The wireless link shown in communication system 100 of FIG. 1 represents one or more different channels, typically different radio frequency (RF) channels, and associated protocols used between wireless network 104 and mobile station 102. An RF channel is a limited resource that must be conserved, typically due to limits in overall bandwidth and a limited battery power of mobile station 102. Those skilled in art will appreciate that a wireless network in actual practice may include hundreds of cells depending upon desired overall expanse of network coverage. All pertinent components may be connected by multiple switches and routers (not shown), controlled by multiple network controllers.

For all mobile station's 102 registered with a network operator, permanent data (such as mobile station 102 user's profile) as well as temporary data (such as mobile station's 102 current location) are stored in a HLR/AC 138. In case of a voice call to mobile station 102, HLR/AC 138 is queried to determine the current location of mobile station 102. A Visitor Location Register (VLR) of MSC 130 is responsible for a group of location areas and stores the data of those mobile stations that are currently in its area of responsibility. This includes parts of the permanent mobile station data that have been transmitted from HLR/AC 138 to the VLR for faster access. However, the VLR of MSC 130 may also assign and store local data, such as temporary identifications. Mobile station 102 is also authenticated on system access by HLR/AC 138. In order to provide packet data services to mobile station 102 in a cdma2000-based network, RN 128 communicates with PDSN 132. PDSN 132 provides access to the Internet 144 (or intranets, Wireless Application Protocol (WAP) servers, etc.) through IP network 134. PDSN 132 also provides foreign agent (FA) functionality in mobile IP networks as well as packet transport for virtual private networking. PDSN 132 has a range of IP addresses and performs IP address management, session maintenance, and optional caching. RADIUS server 136 is responsible for performing functions related to authentication, authorization, and accounting (AAA) of packet data services, and may be referred to as an AAA server.

Those skilled in art will appreciate that wireless network 104 may be connected to other systems, possibly including other networks, not explicitly shown in FIG. 1. A network will normally be transmitting at very least some sort of paging and system information on an ongoing basis, even if there is no actual packet data exchanged. Although the network consists of many parts, these parts all work together to result in certain behaviours at the wireless link.

Figure 2:
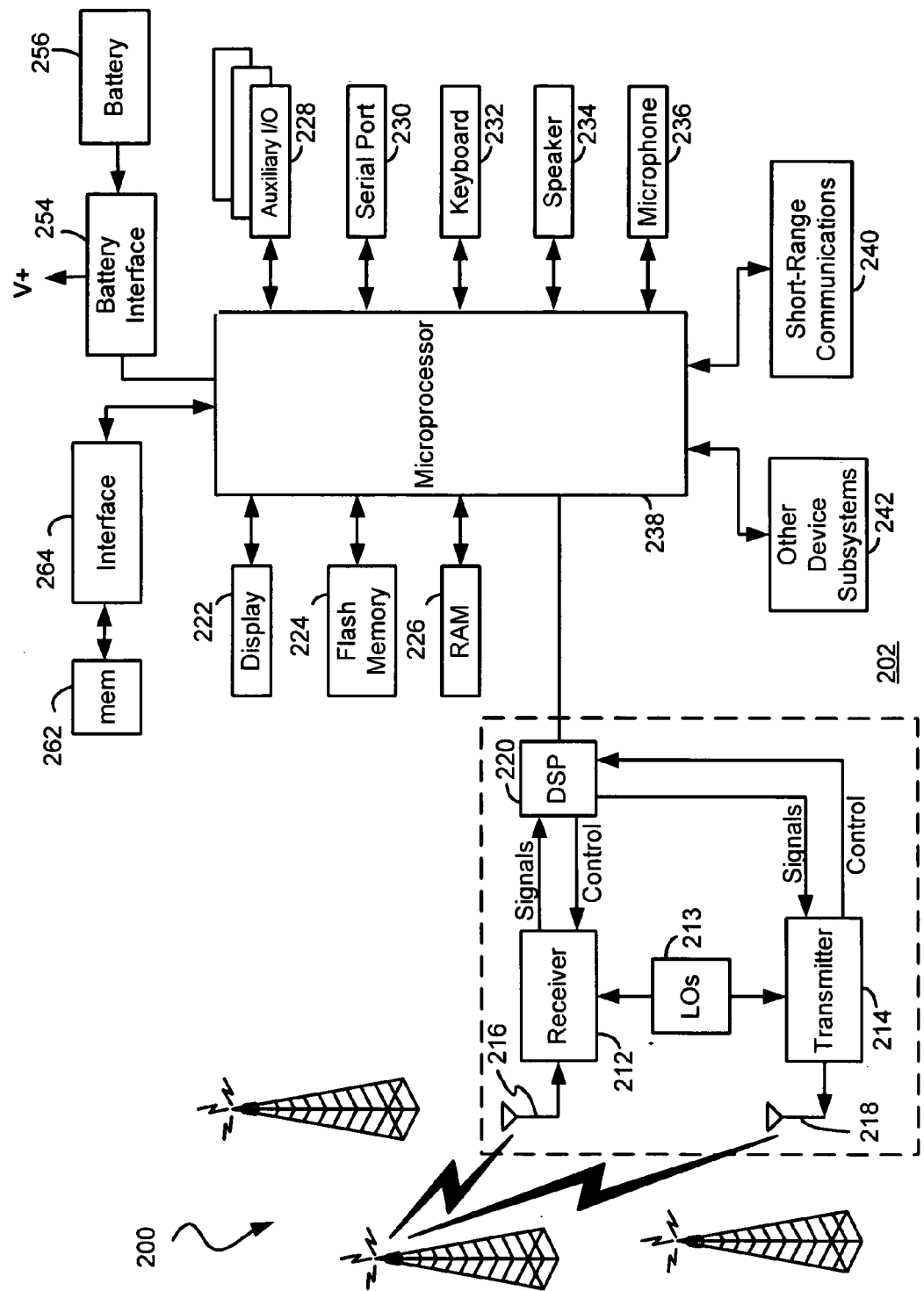
FIG. 2 is a more detailed diagram of a preferred mobile station of FIG. 1.

FIG. 2 is a detailed block diagram of a preferred mobile station 202. Mobile station 202 is preferably a two-way communication device having at least voice and advanced data communication capabilities, including the capability to communicate with other computer systems. Depending on the functionality provided by mobile station 202, it may be referred to as a data messaging device, a two-way pager, a cellular telephone with data messaging capabilities, a wireless Internet appliance, or a data communication device (with or without telephony capabilities). Mobile station 202 may communicate with any one of a plurality of base station transceiver systems 200 within its geographic coverage area.

Mobile station 202 will normally incorporate a communication subsystem 211, which includes a receiver 212, a transmitter 214, and associated components, such as one or more (preferably embedded or internal) antenna elements 216 and 218, local oscillators (LOs) 213, and a processing module such as a digital signal processor (DSP) 220. Communication subsystem 211 is analogous to RF transceiver circuitry 108 and antenna 110 shown in FIG. 1. As will be apparent to those skilled in field of communications, particular design of communication subsystem 211 depends on the communication network in which mobile station 202 is intended to operate.

Mobile station 202 may send and receive communication signals over the network after required network registration or activation procedures have been completed. Signals received by antenna 216 through the network are input to receiver 212, which may perform such common receiver functions as signal amplification, frequency down conversion, filtering, channel selection, and like, and in example shown in FIG. 2, analog-to-digital (A/D) conversion. A/D conversion of a received signal allows more complex communication functions such as demodulation and decoding to be performed in DSP 220. In a similar manner, signals to be transmitted are processed, including modulation and encoding, for example, by DSP 220. These DSP-processed signals are input to transmitter 214 for digital-to-analog (D/A) conversion, frequency up conversion, filtering, amplification and transmission over communication network via antenna 218. DSP 220 not only processes communication signals, but also provides for receiver and transmitter control. For example, the gains applied to communication signals in receiver 212 and transmitter 214 may be adaptively controlled through automatic gain control algorithms implemented in DSP 220.

Network access is associated with a subscriber or user of mobile station 202, and therefore mobile station 202 requires a memory module 262, such as a Subscriber Identity Module or "SIM" card or a Removable User Identity Module (R-UIM), to be inserted in or connected to an interface 264 of mobile station 202 in order to operate in the network. Since mobile station 202 is a mobile battery-powered device, it also includes a battery interface 254 for receiving one or more rechargeable batteries 256. Such a battery 256 provides electrical power to most if not all electrical circuitry in mobile station 202, and battery interface 254 provides for a mechanical and electrical connection for it. The battery interface 254 is coupled to a regulator (not shown in FIG. 2) which provides power V+ to all of the circuitry.

Mobile station 202 includes a microprocessor 238 (which is one implementation of controller 106 of FIG. 1) which controls overall operation of mobile station 202. This control includes network capability communication techniques of the present application. Communication functions, including at least data and voice communications, are performed through communication subsystem 211. Microprocessor 238 also interacts with additional device subsystems such as a display 222, a flash memory 224, a random access memory (RAM) 226, auxiliary input/output (I/O) subsystems 228, a serial port 230, a keyboard 232, a speaker 234, a microphone 236, a short-range communications subsystem 240, and any other device subsystems generally designated at 242. Some of the subsystems shown in FIG. 2 perform communication-related functions, whereas other subsystems may provide "resident" or on-device functions. Notably, some subsystems, such as keyboard 232 and display 222, for example, may be used for both communication-related functions, such as entering a text message for transmission over a communication network, and device-resident functions such as a calculator or task list. Operating system software used by microprocessor 238 is preferably stored in a persistent store such as flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

Microprocessor 238, in addition to its operating system functions, preferably enables execution of software applications on mobile station 202. A predetermined set of applications which control basic device operations, including at least data and voice communication applications, will normally be installed on mobile station 202 during its manufacture. A preferred application that may be loaded onto mobile station 202 may be a personal information manager (PIM) application having the ability to organize and manage data items relating to user such as, but not limited to, e-mail, calendar events, voice mails, appointments, and task items. Naturally, one or more memory stores are available on mobile station 202 and SIM 256 to facilitate storage of PIM data items and other information.

The PIM application preferably has the ability to send and receive data items via the wireless network. In a preferred embodiment, PIM data items are seamlessly integrated, synchronized, and updated via the wireless network, with the mobile station user's corresponding data items stored and/or associated with a host computer system thereby creating a mirrored host computer on mobile station 202 with respect to such items. This is especially advantageous where the host computer system is the mobile station user's office computer system. Additional applications may also be loaded onto mobile station 202 through network, an auxiliary I/O subsystem 228, serial port 230, short-range communications subsystem 240, or any other suitable subsystem 242, and installed by a user in RAM 226 or preferably a non-volatile store (not shown) for execution by microprocessor 238. Such flexibility in application installation increases the functionality of mobile station 202 and may provide enhanced on-device functions, communication-related functions, or both. For example, secure communication applications may enable electronic commerce functions and other such financial transactions to be performed using mobile station 202.

In a data communication mode, a received signal such as a text message, an e-mail message, or web page download will be processed by communication subsystem 211 and input to microprocessor 238. Microprocessor 238 will preferably further process the signal for output to display 222 or alternatively to auxiliary I/O device 228. A user of mobile station 202 may also compose data items, such as e-mail messages, for example, using keyboard 232 in conjunction with display 222 and possibly auxiliary I/O device 228. Keyboard 232 is preferably a complete alphanumeric keyboard and/or telephone-type keypad. These composed items may be transmitted over a communication network through communication subsystem 211.

For voice communications, the overall operation of mobile station 202 is substantially similar, except that the received signals would be output to speaker 234 and signals for transmission would be generated by microphone 236. Alternative voice or audio I/O subsystems, such as a voice message recording subsystem, may also be implemented on mobile station 202. Although voice or audio signal output is preferably accomplished primarily through speaker 234, display 222 may also be used to provide an indication of the identity of a calling party, duration of a voice call, or other voice call related information, as some examples.

Serial port 230 in FIG. 2 is normally implemented in a personal digital assistant (PDA)-type communication device for which synchronization with a user's desktop computer is a desirable, albeit optional, component. Serial port 230 enables a user to set preferences through an external device or software application and extends the capabilities of mobile station 202 by providing for information or software downloads to mobile station 202 other than through a wireless communication network. The alternate download path may, for example, be used to load an encryption key onto mobile station 202 through a direct and thus reliable and trusted connection to thereby provide secure device communication.

Short-range communications subsystem 240 of FIG. 2 is an additional optional component which provides for communication between mobile station 202 and different systems or devices, which need not necessarily be similar devices. For example, subsystem 240 may include an infrared device and associated circuits and components, or a Bluetooth™ communication module to provide for communication with similarly-enabled systems and devices. Bluetooth™ is a registered trademark of Bluetooth SIG, Inc.

As described earlier above, the mobile station and network may be compatible with cdma2000® standards. In accordance with cdma2000® standard Release D (3GPP2 Specification C.S0005-D), an indication of whether or not a mobile station and network supports "concurrent services" may be utilized. Concurrent services are supported by the mobile station and network when at least two different services—specifically a voice call service and a data communication service—may be facilitated simultaneously. Such a mobile station provides for the ability to simultaneously engage in voice telephone calls and data communication sessions (e.g. electronic mail or e-mail communications), where the voice telephone call utilizes a first traffic channel (e.g. a Primary traffic channel) and the data communication session utilizes a second traffic channel (e.g. a Secondary traffic channel).

An in-traffic channel message which includes a CS_SUPPORTED flag is used to indicate whether or not concurrent services are supported. A mobile station indicates its concurrent service capability in a "Capability Information" message to the network. On the other hand, a network broadcasts its concurrent service capability to a mobile station in an overhead message during idle states (specifically, in an "Extended System Parameter" message) or in an in-traffic channel message (specifically, in an "In-Traffic System Parameter" message, a "General Handoff Direction" message, or a "Universal Handoff Direction" message) during voice/data communication states.

If a network supports concurrent services, it may or may not support another specific concurrent service-related feature. For example, although the network may generally support concurrent services, it still may or may not support a Quality of Service (QoS) parameter usage feature requested by the mobile station during call origination associated with a specific application. As another example, the network may or may not support a mobile-initiated position location determination feature. The present application relates specifically to the case where the mobile station is engaged in a call (e.g. a voice or data call) where a traffic channel is utilized and the mobile station is moving onto a new network. If the mobile station receives an indication that the new network generally supports concurrent services ("CS_SUPPORTED=1"), inefficiencies may result if the mobile station assumes that such additional features are or are not supported (e.g. the mobile station initiates a request for a feature that is unsupported by the network, or fails to initiate a request for a feature that is supported by the network).

Figure 3:
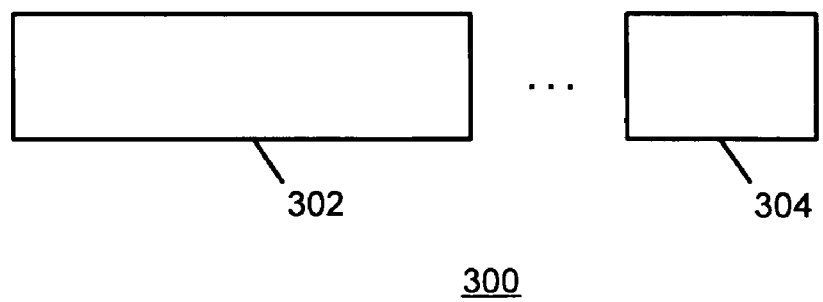
FIG. 3 is a basic illustration of an in-traffic channel message communicated between a base station and a mobile station, the in-traffic channel message including information indicative of whether the network supports concurrent services and additional information indicative of whether the network supports a predetermined concurrent service or feature.

FIG. 3 is a basic illustration of an in-traffic channel message 300 which is communicated between a base station and a mobile station in accordance with the present application. In particular, in-traffic channel message 300 is transmitted from a base station to a mobile station while a traffic channel is established between a base station and the mobile station. In-traffic channel message 300 may be any suitable message which is transmitted from a base station to a mobile station while a traffic channel is established with the mobile station. Preferably, the network is a cdma2000-type network and the in-traffic channel message can be an in-traffic system parameter message, a general handoff direction message, or a universal handoff direction message.

In-traffic channel message 300 includes an information portion 302 which is indicative of whether the network supports concurrent services. For example, information portion 302 may include a bit flag which is set to '0' (CS_SUPPORTED=0) when concurrent services are not supported by the network and set to '1' (CS_SUPPORTED=1) when concurrent services are indeed supported by the network. In addition, in-traffic channel message 300 includes at least one additional information portion 304 indicative of whether the network supports a predetermined concurrent service(s) or feature(s). Since a mobile station is made aware of such additional information, more efficient operation may be realized as will be described in more detail below.

The predetermined concurrent service or feature may be any suitable service or feature pertaining to concurrent services. For example, the predetermined concurrent service or feature may involve Quality of Service (QoS) parameters that the mobile station can request during a data call origination associated with a specific application. In this case, additional information portion 304 includes an indication of whether or not the network allows the mobile station to include the QoS parameters. The mobile-requested QoS parameter usage feature is one in which allows a mobile station to request specific QoS parameters to the network for a specific application. If the feature is supported, the mobile station ordinarily includes such QoS parameters in an Origination message, an Origination Continuation message, or an Enhanced Origination message, to the network. Preferably, additional information portion 304 specifically includes a bit flag which indicates whether or not the QoS parameter usage feature is supported by the network (a bit flag named "MOB_QOS", where MOB_QOS=1 if QoS parameter usage feature is supported and MOB_QOS=0 if unsupported).

As another example, the predetermined concurrent service or feature may be a mobile-initiated position location determination feature. In this case, additional information portion 304 includes an indication of whether or not the network supports the mobile-initiated position location determination feature. The mobile-initiated position location determination feature is one in which allows a mobile station to request and receive its own geographic location. Preferably, additional information portion 304 specifically includes a bit flag which indicates whether or not the position location determination feature is supported by the network (a bit flag named "MS_INIT_POS_LOC_SUP_IND", where MS_INIT_POS_LOC_SUP_IND=1 if feature is supported and MS_INIT_POS_LOC_SUP_IND=0 if unsupported).

Figure 4:
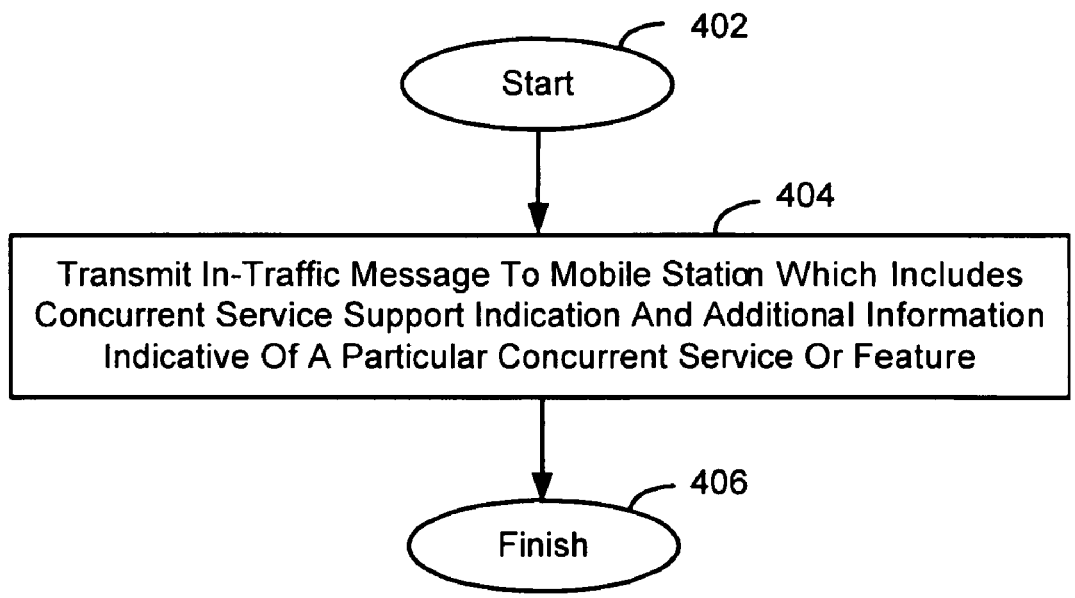
FIG. 4 is a flowchart which describes a method of transmitting the in-traffic channel message of FIG. 3 from the base station to the mobile station.

FIG. 4 is a flowchart which describes a wireless network method of transmitting in-traffic channel message 300 of FIG. 3 from the base station to the mobile station. Beginning at a start block 402 of FIG. 4, the base station transmits the in-traffic channel message to the mobile station (step 404). This message comprising data is constructed or assembled in a processor of a network processing component within the wireless network, and is transmitted with use of a wireless transceiver of the base station. As described above in relation to FIG. 3, the in-traffic channel message includes both a concurrent service support indication and additional information which is indicative of at least one predetermined concurrent service or feature. The in-traffic channel message may be an In-Traffic System Parameter Message, which a base station transmits to a mobile station to provide it with system capability information. On the other hand, the in-traffic channel message may a General Handoff Direction Message or a Universal Handoff Direction Message, which a base station transmits to a mobile station when the mobile station is being handed-off to another base station. The flowchart ends at a finish block 406 of FIG. 4, but the message is received at the mobile station which is described in relation to FIG. 5.

In a variation to that described in relation to FIG. 3-4, the network causes information portion 302 to be transmitted but only allows additional information portion 304 to be subsequently transmitted if concurrent services are indeed support by the network (CS_SUPPORTED=1). Thus, if information portion 302 indicates that concurrent services are supported (CS_SUPPORTED=1), the network causes additional information portion 304 to be included and transmitted. If information portion 302 indicates that concurrent services are unsupported (CS_SUPPORTED=0), the network refrains from causing additional information portion 304 to be subsequently included and/or transmitted to the mobile station (or prohibits portion 304 to be subsequently included or transmitted to the mobile). In the latter case, the mobile station refrains from parsing or processing the bit indication of additional information portion 304.

Figure 5:
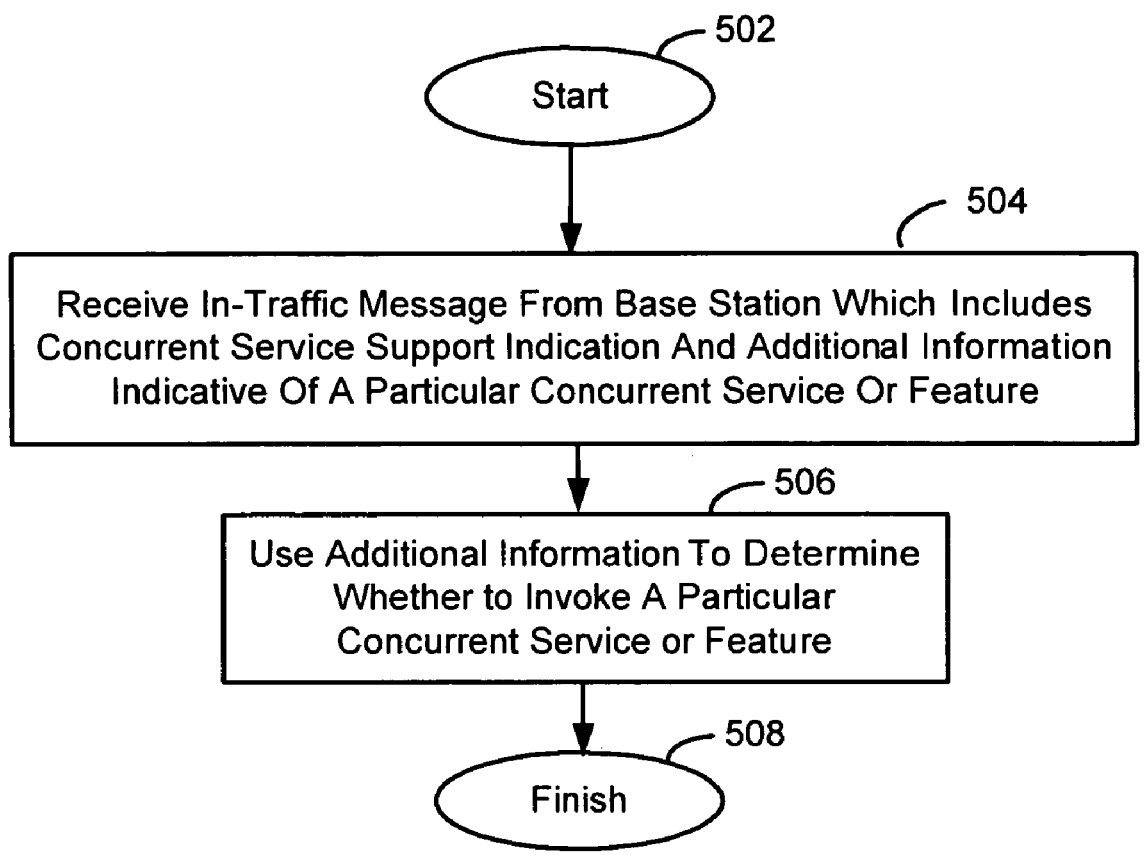
FIG. 5 is a flowchart which is used to describe a method of receiving and processing the in-traffic channel message of FIG. 3 at the mobile station.

FIG. 5 is an associated flowchart which is used to describe a method of receiving and processing in-traffic channel message 300 of FIG. 3 at the mobile station. Beginning at a start block 502 of FIG. 4, the mobile station receives the in-traffic channel message from the base station (step 504). In particular, this message comprising data is received with use of a wireless transceiver and one or more processors of the mobile station. As described above in relation to FIG. 3, the in-traffic channel message includes both a concurrent service support indication and additional information which is indicative of at least one particular concurrent service or feature. The in-traffic channel message may be an In-Traffic System Parameter Message, which a base station transmits to a mobile station to provide it with system capability information. On the other hand, the in-traffic channel message may a General Handoff Direction Message or a Universal Handoff Direction Message, which a base station transmits to a mobile station when the mobile station is being handed-off to another base station. Next, the mobile station utilizes the additional information to determine whether or not to invoke a predetermined concurrent service or feature (step 506). A few exemplary scenarios regarding how the mobile station may utilize this additional information are described in the following paragraph. The flowchart ends at a finish block 508 of FIG. 5.

Consider the following scenario. The mobile station is engaged in a voice call over a traffic channel with a network but is moved to a new location where a different network is utilized. This new different network may or may not provide the same support for services or features than that of the previously used network. For example, the new network may or may not provide support for predetermined concurrent services or features such as the mobile-requested Quality of Service (QoS) parameter usage feature or the mobile-initiated position location determination feature. The end user of the mobile station then invokes the use of concurrent services in the new network. The base station of the new network transmits an in-traffic channel message to the mobile station which indicates that it generally supports concurrent services (CS_SUPPORTED=1).

Consider the case where the QoS parameter usage feature is of relevance. If the previous network did not support the mobile-requested QoS parameter usage feature but the new network does support it, the mobile station includes QoS parameters in an Origination message, an Origination Continuation message, or an Enhanced Origination message, and transmit this message to the network. If the previous network supported the mobile-requested QoS parameter usage feature but the new network does not support it, the mobile station will refrain from including the QoS parameters in such messages given the additional information. This saves network resources and system capacity. Consider the alternative case where the mobile-initiated position location determination feature is of relevance. If the previous network did not support the position location determination but the new network does support it, the mobile station initiates a request for the position location determination feature to the network if required. If the previous network supported mobile-initiated position location determination but the new network does not support it, the mobile station will refrain from initiating a request for the position location determination feature to the network given the additional information. This also saves network resources and system capacity.

Thus, the predetermined concurrent service or feature may be a Quality of Service (QoS) parameter usage feature where the mobile station causes a message to be sent to the wireless network with QoS parameters if the information is indicative that the wireless network supports the mobile-requested QoS parameter usage feature, or refrains from causing the message to be sent to the wireless network with the QoS parameters if the information is indicative that the wireless network fails to support the QoS parameter usage feature. On the other hand, the predetermined concurrent service or feature may be a mobile-initiated position location determination feature where the mobile station causes a position location request message to be sent to the wireless network if the information is indicative that the wireless network supports the position location determination feature, or refrains from causing the position location request message to be sent to the wireless network if the information is indicative that the wireless network fails to support the position location determination feature.

Further details regarding message formatting and operation are provided as highlighted modifications to the existing cdma2000® standard as now described in detail. To again define the problem, in several cases for the previous CDMA standard, the mobile station does not know the base station capability after a handoff: (1) If the mobile hands off to a base station that supports the mobile sending QOS parameters in the Enhanced Origination Message when the last monitored control channel had MOB_QOS set to '0', the mobile is now unable to send the QOS parameters even though the base station supports it. In the handoff message the base station should indicate whether the target base station supports QOS parameters in the Enhanced Origination Message. (2) Likewise, after a handoff the mobile station will not know whether the target base station supports mobile station initiated position determination. If the mobile initiated an emergency call using the Enhanced Origination Message after a handoff, the mobile would not know if it is allowed to initiate position determination. In the handoff message the base station should indicate whether the target base station supports mobile station initiated position determination. For the solution, the following text is the proposed text changes to the standard.

2.6.4.1.4 Processing the In-Traffic System Parameters Message

The mobile station shall store the following parameters from the In-Traffic System Parameters Message:

System identification ($SID_s=SID_r$)

[ . . . ]
The mobile station shall set $BCMC\_ON\_TRAFFIC\_SUP_s$ to $BCMC\_ON\_TRAFFIC\_SUP_r$. If $BCMC\_ON\_TRAFFIC\_SUP_r$ is set to '1', the mobile station shall store $AUTO\_REQ\_TRAF\_ALLOWED\_IND_s=AUTO\_REQ\_TRAF\_ALLOWED\_IND_r$.

If included, permission for the mobile station to request QoS settings in the Origination Message, Origination Continuation Message, or Enhanced Origination Message ($MOB\_QOS_s=MOB\_QOS_r$)

Mobile station initiated position location determination supported indicator ($MS\_INIT\_POS\_LOC\_SUP\_IND_s=MS\_INIT\_POS\_LOC\_SUP\_IND_r$).

The mobile station shall determine its roaming status (see 2.6.5.3). The mobile station should indicate to the user whether the mobile station is roaming.

[ . . . ]

2.6.6.2.5 Handoff Messages 2.6.6.2.5.1 Processing of Forward Traffic Channel Handoff Messages

[ . . . ]
11. Universal Handoff Direction Message: The mobile station shall process the message as follows:

[ . . . ]
Store the following parameters from the Universal Handoff Direction Message:

[ . . . ]
If $ENC\_SUPPORTED_r$ is equal to '1', the mobile station shall store:
Signaling encryption supported indicator ($SIG\_ENCRYPT\_SUP_s=SIG\_ENCRYPT\_SUP_r$)
User information encryption supported indicator ($UI\_ENCRYPT\_SUP_s=UI\_ENCRYPT\_SUP_r$)
Sync ID supported indicator ($USE\_SYNC\_IDS=USE\_SYNC\_ID_r$) if included.
Permission for the mobile station to request QoS settings in the Origination Message, Origination Continuation Message, or Enhanced Origination Message ($MOB\_QOS_s=MOB\_QOS_r$) if included.
The mobile station initiated position location determination supported indicator ($MS\_INIT\_POS\_LOC\_SUP\_IND_s=MS\_INIT\_POS\_LOC\_SUP\_IND_r$).
If $CH\_IND_r$ is equal to '101', the mobile station shall perform the following:

[ . . . ]

3.7.3.3.2.7 In-Traffic System Parameters Message

MSG_TAG: ITSPM

[ . . . ]

| Field | Length (bits) |
| --- | --- |
| CS_SUPPORTED | 1 |
| [ . . . ] | |
| REV_PDCH_SUPPORTED | 0 or 1 |
| MOB_QOS | 0 or 1 |
| MS_INIT_POS_LOC_SUP_IND | 1 |

SID—System identification.
The base station shall set this field to the system identification number for this wireless system (see 2.6.5.2).

[ . . . ]
REV_PDCH_SUPPORTED—Reverse Packet Data Channel supported indicator.
If FOR_PDCH_SUPPORTED is set to '0', the base station shall omit this field; otherwise, the base station shall include this field and set it as follows.
If the base station supports the Reverse Packet Data Channel (R-PDCH), the base station shall set this field to '1'; otherwise, the base station shall set this field to '0'.
MOB_QOS—Indicator granting permission to the mobile station to request QoS parameter settings in the Origination Message, Origination Continuation Message, or Enhanced Origination Message.

If CS_SUPPORTED is equal to '0' the base station shall omit this field; otherwise the base station shall include this field and shall set it as follows:

The base station shall set this field to '1', if the mobile station is allowed to include a QoS record in the Origination Message, Origination Continuation Message, or Enhanced Origination Message; otherwise, the base station shall set this field to '0'.

MS_NIT_POS_LOC_SUP_IND—Mobile station initiated position location determination supported indicator.

If the base station supports mobile station initiated position determination, the base station shall set this field to '1'; otherwise, the base station shall set this field to '0'.

[ . . . ]

3.7.3.3.2.36 Universal Handoff Direction Message

MSG_TAG: UHDM

| Field | Length (bits) |
|---|---|
| USE_TIME | 1 |
| [ . . . ] | |
| USE_SYNC_ID | 1 |
| MOB_QOS | 0 or 1 |
| MS_INIT_POS_LOC_SUP_IND | 1 |

[ . . . ]

USE_TIME—Use action time indicator.
This field indicates whether an explicit action time is specified in this message.
If an explicit action time is specified in this message, the base station shall set this field to '1'; otherwise, the base station shall set this field to '0'.

[ . . . ]

USE_SYNC_ID—Sync ID supported indicator.
The base station shall set this field to '1' to indicate that the mobile station is permitted to include the SYNC_ID field in the Page Response Message, the Reconnect Message, the Origination Message, and the Enhanced Origination Message; otherwise, the base station shall set this field to '0'.

MOB_QOS—Indicator granting permission to the mobile station to request QoS parameter settings in the Origination Message, Origination Continuation Message, or Enhanced Origination Message.
If CS_SUPPORTED is equal to '0' the base station shall omit this field; otherwise the base station shall include this field and shall set it as follows:
The base station shall set this field to '1', if the mobile station is allowed to include a QoS record in the Origination Message, Origination Continuation Message, or Enhanced Origination Message; otherwise, the base station shall set this field to '0'.

MS_INIT_POS_LOC_SUP_IND—Mobile station initiated position location determination supported indicator.
If the target base station supports mobile station initiated position determination, the base station shall set this field to '1'; otherwise, the base station shall set this field to '0'.

[ . . . ]

Final Comments. Methods and apparatus for the communication of network capability information are described. When a mobile station is engaged in a call, an in-traffic channel message is transmitted from a base station of a wireless communication network to the mobile station. The message includes information indicative of whether the network supports a predetermined concurrent service or feature. The predetermined concurrent service or feature may be a mobile-requested Quality of Service (QoS) parameter usage feature or a mobile-initiated position location determination feature. The in-traffic channel message may be an in-traffic system parameter message, a general handoff direction message, or a universal handoff direction message, as examples. Preferably, the network is a cdma2000-type network. Since the mobile station is made aware of such information, more efficient operation may be realized. A computer program product of the present application includes a computer storage medium as well as computer instructions stored on the computer storage medium. The computer storage medium may be any memory in the base station or mobile station or even a floppy disk or CD-ROM, as examples. The computer instructions are executable by a processor (e.g. a microprocessor) to perform the steps of the method. A network processing component of the present application includes one or more processors; memory; computer instructions stored in the memory which are executable by the one or more processors to perform the steps of the method.

A related for the communication of network capability information may be performed by the mobile station. During a call, the mobile station maintains a traffic channel with a wireless communication network. The mobile station may receive an in-traffic channel message from the wireless network, which includes information indicative of whether the wireless network supports a predetermined concurrent service or feature. The predetermined concurrent service or feature may be a mobile-requested Quality of Service (QoS) parameter usage feature or a mobile-initiated position location determination feature. If the predetermined concurrent service or feature is a mobile-requested Quality of Service (QoS) parameter usage feature, the mobile station causes a message to be sent to the wireless network with QoS parameters if the information is indicative that the wireless network supports the QoS parameter usage feature, or refrains from causing the message to be sent to the wireless network with the QoS parameters if the information is indicative that the wireless network fails to support the QoS parameter usage feature. If the predetermined concurrent service or feature is a position location determination feature, the mobile station causes a position location request message to be sent to the wireless network if the information is indicative that the wireless network supports the position location determination feature, or refrains from causing the position location request message to be sent to the wireless network if the information is indicative that the wireless network fails to support the position location determination feature. A mobile station of the present application includes one or more processors and a wireless transceiver coupled to the one or more processors. The one or more processors of the mobile station are operative to perform the steps of the method.

The above-described embodiments of the present application are intended to be examples only. Those of skill in the art may effect alterations, modifications and variations to the particular embodiments without departing from the scope of the application. The invention described herein in the recited claims intends to cover and embrace all suitable changes in technology.

What is claimed is:

1. A method for use in communicating network capability information associated with concurrent services for a wireless communication network to mobile stations configured to operate in the wireless network, the concurrent services providing for simultaneous use of a voice call service and a data communication service for a given mobile station, the method comprising:

providing a radio traffic channel with a mobile station for a call involving the mobile station;

causing an in-traffic channel message to be transmitted to the mobile station during the call, the in-traffic channel message including a bit indication defined to indicate whether or not the concurrent services are supported by the wireless network, and further including an additional indication defined to indicate whether or not the wireless network supports a particular concurrent service related feature utilized in the concurrent services, the particular concurrent service related feature being a mobile-initiated position location determination feature, and wherein the additional indication is one of a first setting or a second setting, the first setting indicating that the wireless network supports the mobile-initiated position location determination feature and the second setting indicating that the wireless network fails to support the mobile-initiated position location determination feature;

when the additional indication indicates that the wireless network supports the mobile-initiated position location determination feature, receiving a position location request message from the mobile station; and otherwise, when the additional indication indicates that the wireless, network fails to support the mobile-initiated position location determination feature, failing to receive the position location request message from the mobile station.

2. The method of claim 1, wherein the additional indication is a first additional indication and the particular concurrent service related feature is a first particular concurrent service related feature, the in-traffic channel message further including a second additional indication defined to indicate whether or not the wireless network supports a second particular concurrent service related feature utilized in the concurrent services, the second particular concurrent service related feature being a mobile-requested Quality of Service (QoS) parameter usage feature, and wherein the second additional indication is one of a first setting or a second setting, the first setting indicating that the wireless network supports the mobile-requested QoS parameter usage feature and the second setting indicating that the wireless network fails to support the mobile-requested QoS parameter usage feature.

3. The method of claim 1, wherein the in-traffic channel message comprises one of an in-traffic system parameter message, a general handoff direction message, and a universal handoff direction message.

4. The method of claim 1, wherein the in-traffic channel message provides the additional indication only if the wireless network supports the concurrent services.

5. A method for use in communicating network capability information associated with concurrent services of a wireless communication network to mobile stations configured to operate in the wireless communication network, the concurrent services providing for simultaneous use of a voice call service and a data communication service for a given mobile station, the method comprising:

providing a radio traffic channel with a mobile station for a call involving the mobile station;

causing an in-traffic channel message to be transmitted to the mobile station during the call, the in-traffic channel message including a bit indication defined to indicate whether or not the concurrent services are supported by the wireless network, and further including an additional indication defined to indicate whether or not the wireless network supports a particular concurrent service related feature utilized in the concurrent services, the particular concurrent service related feature being a mobile-requested Quality of Service (QoS) parameter usage feature for which the wireless network is configured to receive and process QoS parameters requested by the mobile station in an origination message to the wireless network, and wherein the additional indication is one of a first setting or a second setting, the first setting indicating that the wireless network supports the mobile-requested QoS parameter usage feature and the second setting indicating that the wireless network fails to support the mobile-requested QoS parameter usage feature;

when the additional indication indicates that the wireless network supports the mobile-requested QoS parameter usage feature, receiving from the mobile station the origination message with QoS parameters; and otherwise, when the additional indication indicates that the wireless network fails to support the mobile-requested QoS parameter usage feature, receiving from the mobile station the origination message without the QoS parameters.

6. The method of claim 5, wherein the additional indication is a first additional indication and the particular concurrent service related feature is a first particular concurrent service related feature, the in-traffic channel message further including a second additional indication defined to indicate whether or not the wireless network supports a second particular concurrent service related feature utilized in the concurrent services, the second particular concurrent service related feature being a mobile-initiated position location determination feature, and wherein the second additional indication is one of a first setting or a second setting, the first setting indicating that the wireless network supports the mobile-initiated position location determination feature and the second setting indicating that the wireless network fails to support the mobile-initiated position location determination feature.

7. The method of claim 5, wherein the in-traffic channel message comprises one of an in-traffic system parameter message, a general handoff direction message, and a universal handoff direction message.

8. The method of claim 5, wherein the in-traffic channel message includes the additional indication only if the wireless network supports the concurrent services, and fails to include the additional indication if the wireless network fails to support the concurrent services.

9. A network processing component of a wireless communication network for use in communicating network capability information associated with concurrent services to mobile stations configured to operate in the wireless network, the concurrent services providing for simultaneous use of a voice call service and a data communication service for a given mobile station, the network processing component comprising:

one or more processors;

memory;

computer instructions stored in the memory;

the computer instructions being executable by the one or more processors for:

providing a radio traffic channel with a mobile station for a call involving the mobile station;

causing an in-traffic channel message to be transmitted to the mobile station, the in-traffic channel message including a bit indication defined to indicate whether or not the concurrent services are supported by the wireless network, and further including an additional indication defined to indicate whether or not the wireless network supports a particular concurrent service related feature utilized in the concurrent services, the particular concurrent service related feature being a mobile-initiated position location determination feature, and wherein the additional indication is one of a first setting and a second setting, the first setting indicating that the wireless network supports the mobile-initiated position location determination feature and the second setting indicating that the wireless network fails to support the mobile-initiated position location determination feature;

when the additional indication indicates that the wireless network supports the mobile-initiated position location determination feature, receive a position location request message from the mobile station; and otherwise, when the additional indication indicates that the wireless network fails to support the mobile-initiated position location determination feature, fail to receive the position location request message from the mobile station.

10. The network processing component of claim 9, wherein the additional indication is a first additional indication and the particular concurrent service related feature is a first particular concurrent service related feature, the in-traffic channel message further including a second additional indication defined to indicate whether or not the wireless network supports a second particular concurrent service related feature utilized in the concurrent services, the second particular concurrent service related feature being a mobile-requested Quality of Service (QoS) parameter usage feature for which the wireless network is configured to receive and process QoS parameters requested by the mobile station in an origination message to the wireless network, and wherein the second additional indication is one of a first setting or a second setting, the first setting indicating that the wireless network supports the mobile-requested QoS parameter usage feature and the second setting indicating that the wireless network fails to support the mobile-requested QoS parameter usage feature.

11. The network processing component of claim 9, wherein the in-traffic channel message comprises one of an in-traffic system parameter message, a general handoff direction message, and a universal handoff direction message.

12. The network processing component of claim 9, wherein the in-traffic channel message provides the additional indication only if the wireless network supports concurrent services.

13. A method in a mobile station configured to operate in a wireless communication network with use of concurrent services, the concurrent services providing for simultaneous use of a voice call service and a data communication service for the mobile station, the method comprising:

maintaining a traffic channel for a call;

receiving, in the mobile station, an in-traffic channel message;

the in-traffic channel message including a bit indication defined to indicate whether or not the concurrent services are supported by the wireless network, and further including an additional indication defined to indicate whether or not the wireless network supports a particular concurrent service related feature utilized in the concurrent services, the particular concurrent service related feature being a mobile-initiated position location determination feature, and wherein the additional indication is one of a first setting or a second setting, the first setting indicating that the wireless network supports the mobile-initiated position location determination feature and the second setting indicating that the wireless network fails to support the mobile-initiated position location determination feature;

when the additional indication indicates that the wireless network supports the mobile-initiated position location determination feature, allowing a position location request message to be sent to the wireless network for execution of the mobile-initiated position location determination feature and the mobile station's receiving of its geographic location; and otherwise, when the additional indication indicates that the wireless network fails to support the mobile-initiated position location determination feature, disallowing the sending of the position location request message to the wireless network.

14. The method of claim 13, wherein the additional indication is a first additional indication and the particular concurrent service related feature is a first concurrent service related feature, the in-traffic channel message further including a second additional indication defined to indicate whether or not the wireless network supports a second particular concurrent service feature utilized in the concurrent services, the second particular concurrent service related feature being a mobile-requested Quality of Service (QoS) parameter usage feature for which the wireless network is configured to receive and process QoS parameters requested by the mobile station in an origination message to the wireless network, and wherein the second additional indication is one of a first setting or a second setting, the first setting indicating that the wireless network supports the mobile-requested QoS parameter usage feature and the second setting indicating that the wireless network fails to support the mobile-requested QoS parameter usage feature.

15. The method of claim 13, wherein the in-traffic channel message comprises one of an in-traffic system parameter message, a general handoff direction message, and a universal handoff direction message.

16. The method of claim 13, wherein the in-traffic channel message provides the additional indication only if the wireless network supports concurrent service.

17. The method of claim 14, further comprising:

causing a message to be sent to the wireless network with QoS parameters if the second additional indication indicates that the wireless network supports the mobile-requested QoS parameter usage feature; and refraining from causing the message to be sent to the wireless network with the QoS parameters if the second additional indication indicates that the wireless network fails to support the mobile-requested QoS parameter usage feature.

18. A method in a mobile station configured to operate in a wireless communication network with use of concurrent services, the concurrent services providing for simultaneous use of a voice call service and a data communication service for the mobile station, the method comprising:

maintaining a radio traffic channel for a call;

receiving, in the mobile station, an in-traffic channel message during the call, the in-traffic channel message including a bit indication defined to indicate whether or not the concurrent services are supported by the wireless network, and further including an additional indication defined to indicate whether or not the wireless network supports a particular concurrent service feature utilized in the concurrent services, the particular concurrent service related feature being a mobile-requested Quality of Service (QoS) parameter usage feature for which the wireless network is configured to receive and process QoS parameters requested by the mobile station in an origination message to the wireless network, and wherein the additional indication is one of a first setting or a second setting, the first setting indicating that the wireless network supports the mobile-requested QoS parameter usage feature and the second setting indicating that the wireless network fails to support the mobile-requested QoS parameter usage features;

when the additional indication indicates that the wireless network supports the mobile-requested QoS parameter usage feature, sending the origination message to the wireless network with QoS parameters; and otherwise, when the additional indication indicates that the wireless network fails to support the mobile-requested QoS parameter usage feature, sending the origination message to the wireless network without the QoS parameters.

19. The method of claim 18, wherein the additional indication is a first additional indication and the particular concurrent service feature is a first particular concurrent service feature, the in-traffic channel message further including a second additional indication defined to indicate whether or not the wireless network supports a second particular concurrent service feature utilized in the concurrent services, the second particular concurrent services being a mobile-initiated position location determination feature, and wherein the second additional indication is one of a first setting or a second setting, the first setting indicating that the wireless network supports the mobile-initiated position location determination feature and the second setting indicating that the wireless network fails to support the mobile-initiated position location determination feature.

20. The method of claim 18, wherein the in-traffic channel message comprises one of an in-traffic system parameter message, a general handoff direction message, and a universal handoff direction message.

21. The method of claim 18, wherein the in-traffic channel message includes the additional indication only if the wireless network supports the concurrent services, and fails to include the additional indication if the wireless network fails to support the concurrent services.

22. A mobile station configured to operate in a wireless communication network with use of concurrent services, the concurrent services providing for simultaneous use of a voice call service and a data communication service for the mobile station, the mobile station comprising:

a wireless transceiver operative for communications with the wireless communication network;

one or more processors coupled to the wireless transceiver;

the one or more processors being operative to:

maintain a radio traffic channel for a call;

receive an in-traffic channel message, the in-traffic channel message including a bit indication defined to indicate whether or not the concurrent services are supported by the wireless network, and further including an additional indication defined to indicate whether or not the wireless network supports a particular concurrent service feature utilized in the concurrent services, the particular concurrent service related feature being a mobile-initiated position location determination feature, and wherein the additional indication is one of a first setting or a second setting, the first setting indicating that the wireless network supports the mobile-initiated position location determination feature and the second setting indicating that the wireless network fails to support the mobile-initiated position location determination feature;

when the additional indication indicates that the wireless network supports the mobile-initiated position location determination feature, allow a position location request message to be sent to the wireless network; and otherwise, when the additional indication indicates that the wireless network fails to support the mobile-initiated position location determination feature, disallow the sending of the position location request message to the wireless network.

23. The mobile station of claim 22, wherein the additional indication is a first additional indication and the particular concurrent service related feature is a first particular concurrent service related feature, the in-traffic channel message further including a second additional indication defined to indicate whether or not the wireless network supports a second particular concurrent service feature utilized in the concurrent services, the second particular concurrent service related feature being a mobile-requested Quality of Service (QoS) parameter usage feature for which the wireless network is configured to receive and process QoS parameters requested by the mobile station in an origination message to the wireless network, and wherein the second additional indication is one of a first setting or a second setting, the first setting indicating that the wireless network supports the mobile-requested QoS parameter usage feature and the second setting indicating that the wireless network fails to support the mobile-requested QoS parameter usage feature.

24. The mobile station of claim 22, wherein the in-traffic channel message comprises one of an in-traffic system parameter message, a general handoff direction message, and a universal handoff direction message.

25. The mobile station of claim 22, wherein additional indication is an additional bit indication in the in-traffic channel message.

26. The mobile station of claim 23, wherein the one or more processors being further operative to:

cause an origination message to be sent to the wireless network with QoS parameters if the second additional indication indicates that the wireless network supports the mobile-requested QoS parameter usage feature; and refrain from causing the origination message to be sent to the wireless network with the QoS parameters if the second additional indication indicates that the wireless network fails to support the mobile-requested QoS parameter usage feature.

27. The method of claim 1, which is embodied in a computer program product comprising a computer readable medium and computer instructions stored in the computer readable medium, where the computer instructions are by on one or more processors for performing the method.

28. The method of claim 5, which is embodied in a computer program product comprising a computer readable medium and computer instructions stored in the computer readable medium, where the computer instructions are executable by one or more processors for performing the method.

29. The method of claim 13, which is embodied in a computer program product comprising a computer readable medium and computer instructions stored in the computer readable medium, where the computer instructions are executable by one or more processors for performing the method.

30. The method of claim 18, which is embodied in a computer program product comprising a computer readable medium and computer instructions stored in the computer readable medium, where the computer instructions are executable by one or more processors for performing the method.

31. The method of claim 1, wherein the additional indication is an additional bit indication having first and second settings of '0' and '1'.

32. The network processing component of claim 9, wherein the additional indication is an additional bit indication having first and second settings of '0' and '1'.

33. The method of claim 13, wherein the additional indication is an additional bit indication having first and second settings of '0' and '1'.

34. The mobile station of claim 22, wherein the additional indication is an additional bit indication having first and second settings of '0' and '1'.

35. The method of claim 5, wherein the additional indication is an additional bit indication having first and second settings of '0' and '1'.

* * * * *